(12) United States Patent
Gist et al.

(10) Patent No.: US 11,805,741 B2
(45) Date of Patent: Nov. 7, 2023

(54) MOBILE HORTICULTURE WORKSTATION

(71) Applicant: MONROVIA NURSERY COMPANY, Azusa, CA (US)

(72) Inventors: Charles Marrs Gist, Tulare, CA (US); Daniel Jaquith, McMinnville, OR (US); Fernando Lopez, Keizer, OR (US); Joshua Zaik, Lafayette, OR (US)

(73) Assignee: Monrovia Nursery Company, Monrovia, CA (US)

( * ) Notice: Subject to any disclaimer, the term of this patent is extended or adjusted under 35 U.S.C. 154(b) by 582 days.

(21) Appl. No.: 17/098,252

(22) Filed: Nov. 13, 2020

(65) Prior Publication Data

US 2022/0151160 A1    May 19, 2022

(51) Int. Cl.
*A01G 3/08*    (2006.01)
*B62D 63/06*    (2006.01)
(Continued)

(52) U.S. Cl.
CPC ............. *A01G 3/08* (2013.01); *B62D 63/062* (2013.01); *B62D 63/08* (2013.01); *B60G 17/00* (2013.01); *B60G 2500/30* (2013.01); *B65G 15/00* (2013.01); *B65G 21/00* (2013.01); *B65G 47/00* (2013.01)

(58) Field of Classification Search
None
See application file for complete search history.

(56) References Cited

U.S. PATENT DOCUMENTS

| 2,869,283 A | 1/1959 | Krause |
| 3,337,986 A | 8/1967 | Boucher |

(Continued)

FOREIGN PATENT DOCUMENTS

| EP | 2486783 A1 * | 8/2012 | ............ A01G 9/088 |
| EP | 2486783 A1 | 8/2012 | |

(Continued)

OTHER PUBLICATIONS

European Search Report, Application No. 20212751, dated Sep. 20, 2021, 9 pages.

(Continued)

*Primary Examiner* — Kavel Singh
(74) *Attorney, Agent, or Firm* — Lewis Roca Rothgerber Christie LLP

(57) ABSTRACT

A mobile, self-powered, horticultural processing unit capable of facilitating the processing of a large number of plants, is disclosed. In particular a modular unit with a multi-level configuration and a compact footprint capable of performing a variety of different horticultural operations is the subject of present embodiments. The unit may utilize a wheel and suspension assembly attached to a hydraulic lift and towing hardware which permits the unit to be towed as a trailer. The unit may comprise a plurality of conveying platforms which permit access by a forklift, as to allow many plants to be input and removed from the unit at once. The unit may assist in the fully or partially automated pruning, canning, fertilizing, treating, and spacing of plants potted in individual containers. Collectively, the cost and labor involved with growing and maintaining plants in the field may be greatly reduced.

18 Claims, 7 Drawing Sheets

(51) Int. Cl.
*B62D 63/08* (2006.01)
*B60G 17/00* (2006.01)
*B65G 15/00* (2006.01)
*B65G 21/00* (2006.01)
*B65G 47/00* (2006.01)

(56) References Cited

U.S. PATENT DOCUMENTS

| | | | | |
|---|---|---|---|---|
| 3,602,359 | A * | 8/1971 | Miya | B07C 3/087 |
| | | | | 198/350 |
| 4,138,340 | A * | 2/1979 | Suzuki | B65G 15/52 |
| | | | | 198/698 |
| 4,382,332 | A | 5/1983 | Dominge | |
| 10,683,177 | B2 * | 6/2020 | McCloskey | B65G 19/04 |
| 2002/0182046 | A1 | 12/2002 | Schempf et al. | |

FOREIGN PATENT DOCUMENTS

| | | |
|---|---|---|
| FR | 2475472 | 8/1981 |
| WO | 2014011035 A2 | 1/2014 |

OTHER PUBLICATIONS

Canadian Office action for Application No. 3,110, 216, dated Nov. 4, 2021, 5 pages.
Canadian Search Report dated May 11, 2021, Application Serial No. 3,110,216, 5 pages.
Canadian Office action for Application No. 3110216, dated May 24, 2023, 5 pages.

* cited by examiner

MOBILE HORTICULTURE WORKSTATION

FIELD

The invention relates to machinery and apparatuses for horticulture and horticultural processing. More specifically, it relates to mobile horticulture and horticultural processing units which can be adapted to work in the field.

BACKGROUND

In the art of horticulture, it is commonplace to raise a large number of plants from seeds to mature plants which can be sold or harvested. As plants progress through their life cycle into a final horticultural product, they often require various operations to be performed on them in order to appropriately manage their growth and maintain their health. How immature plants are processed at various stages throughout their life cycle, including how they are transported from the field or greenhouse to the location where the processing machinery is located, and back again, are expensive and labor-intensive parts of the horticultural process. Some of the horticultural operations which plants may undergo include pruning, spacing, adding stakes, weeding, canning, watering, rinsing, and application of fertilizers and pesticides.

While some horticultural products are grown only in the field and are processed by workers in the field, many other horticultural products are initially grown in portable pots. Growth in portable pots allows for the improved germination and growth of plants in the off season in a controlled environment, which can protect the plants from the elements and pests. Some of these plants are eventually moved out into the field where they continue to grow in their containers before being transplanted into the ground or other more permanent setting, while others may be sold in their temporary container in their immature phase. Much of the horticultural processing that is required of plants grown at nurseries is conducted while plants are still in growing in portable containers.

Presently, plants which are grown in portable containers, either in the field or in a greenhouse, are loaded onto a truck and transported to a warehouse or other facility where horticultural processing machinery is located. The labor required to arrange the plants, load the vehicles, and process the plants is time consuming and expensive. There remains a need in the art for an apparatus in which a large number of immature plants can be efficiently processed by horticultural machinery and individual workers, without having to be transported to a location remote from the field or greenhouse where they are grown.

SUMMARY

It is appreciated by the inventors that there is a lack of a horticultural apparatus capable of facilitating the efficient and effective processing of a large number of immature plants in the field. In particular, it is appreciated that the size of horticultural processing machinery, linear configuration of processing machinery, and the need for access by a large loading vehicle, such as a forklift, present difficult challenges in the development of a mobile workstation which will allow for efficient and effective processing of plants in the field.

In accordance with embodiments of the invention, a portable, self-powered, horticultural processing unit is disclosed. The unit may comprise a frame upon which components are mounted, a wheel and suspension assembly upon which the frame is mounted, a hydraulic lift attached to the wheel and suspension assembly configured to lift the apparatus off the ground and onto the wheel and suspension assembly, towing hardware attached to the frame, a plurality of conveying platforms, a generator configured to power the unit and provide standardized electrical connections, where at least one conveying platform is configured to allow for input of a plurality of plants, and where at least one conveying platform is configured to allow for removal of a plurality of plants.

The unit may further include a plurality of rotary belts which rotate plants along a portion of a length of at least one of the conveying platforms, a structure positioned along a length of at least one of the conveying platforms which moves back and forth in a direction substantially orthogonal to the length of the conveying platform, with the unit being configured such that one conveying platform is positioned above another conveying platform.

In accordance with another embodiment of the invention, a portable horticultural processing system is disclosed. The system may comprise a frame upon which components are mounted, a wheel and suspension assembly upon which the frame is mounted, a hydraulic lift attached to the wheel and suspension assembly configured to lift the apparatus off the ground and onto the wheel and suspension assembly, a towing hardware assembly attached to the frame which allows for the system to be towed by a motor vehicle, an upper platform situated on an upper level, a lower platform situated on a lower level, a series of conveying platforms configured to move at least one plant along a path from the upper level to the lower level, and at least one structure configured to mount horticultural processing machinery along the path established by the series of conveying platforms. The series of conveying platform may be configured to allow for access by a forklift at the upper platform, in at least one direction, and the lower platform, in at least one direction.

The system may also include an onboard generator to provide power for the system, and a plurality of guidewheels along at least a portion of the conveying platforms. In addition, one or more platforms of the system may comprise a workstation configured for use by a worker to access to plants as they move along the conveying platform.

In accordance with another embodiment of the invention, an apparatus capable of facilitating the efficient and effective processing of a large number of immature plants in the field is disclosed. The apparatus may comprise a first upper conveying platform positioned on an upper level which moves in at least one direction, a second lower conveying platform positioned on a lower level which moves in at least one direction, and which is positioned below the first upper conveying platform, a third conveying platform positioned adjacent to the first upper conveying platform which moves in at least one direction substantially orthogonal to the first conveying platform, a fourth conveying platform positioned adjacent to the third conveying platform which moves in at least one direction substantially orthogonal to the third conveying platform, a fifth conveying platform positioned adjacent to the fourth conveying platform which moves in at least one direction substantially orthogonal to the fourth conveying platform, a sixth conveying platform positioned adjacent to the fifth conveying platform which moves in at least one direction and connects at least one platform on the upper level to at least one platform on the lower level, and a seventh conveying platform positioned adjacent to the sixth conveying platform which moves in at least one direction substantially parallel to the third conveying platform. The seventh conveying platform may be adjacent to the second conveying platform, and the first and second conveying platforms may be adapted to allow for access by a forklift from at least one direction.

The apparatus may further comprise a first series of rollers positioned generally in an arc which begin at the third conveying platform and end at the fifth conveying platform, a second series of rollers positioned generally in an arc which begin at the fifth conveying platform and end at the sixth conveying platform, and a third series of rollers positioned generally in an arc which begin at the sixth conveying platform and end at the seventh conveying platform. The unit may further include a pushover member positioned adjacent to a conveying platform, and the pushover member may be adjacent to seventh conveying platform. The pushover member may move discontinuously in a repeating motion in at least one direction substantially orthogonal to the length of the seventh conveying platform.

The apparatus may also include an eighth conveying platform positioned adjacent to the seventh conveying platform, which is also adjacent to the second lower conveying platform. The eighth conveying platform may move discontinuously in a repeating motion in at least one direction. The seventh conveying platform may include a structure positioned along a length of the seventh conveying platform which moves back and forth in a direction substantially orthogonal to the length of the seventh conveying platform. The structure may be a pushover member.

The apparatus may further comprise a plurality of rotary belts. The plurality of rotary belts may comprise a first series of rotary belts located along the length of a first side of a conveying platform, orientated substantially orthogonal to the conveying platform, which move in at least one direction; and a second series of rotary belts located along the length of a second side of a conveying platform, orientated substantially orthogonal to the conveying platform, which move in at least one direction. The first and second series of rotary belts may rotate an object which passes between them on the conveying platform.

The apparatus may include equipment mounts located along at least one conveying platform, where the equipment mounts are configured to mount equipment used for pruning, spraying, and staking plants. The equipment may include a nutrient delivery system configured to provide nutrients to plants along at least one conveying platform as they move along the platform in at least one direction. It may also include at least one work station configured for use by a person mounted along a length of at least one of the conveying platforms, which provides access to objects moving along at least one conveying platform.

The apparatus may include a vertically orientated pruning blade positioned along a conveying platform, and a horizontally orientated pruning blade positioned along a conveying platform. The pruning blades may be located along the fifth conveying platform, and may have adjustable speed. The apparatus may further comprise a collection bin positioned underneath a conveying platform, and the collection bin may be attached to a hydraulic lift to dump its contents.

The exterior components of the apparatus may be water resistant as to allow for operation during rain. It may also include an onboard generator which is configured to power the apparatus and provide at least one standard 240 V electrical connection.

BRIEF DESCRIPTIONS OF DRAWINGS

DETAILED DESCRIPTION

It is appreciated by the inventors that there is a lack of a horticultural apparatus capable of efficiently and effectively processing of a large number of immature plants in the field. In particular it is appreciated that the size of horticultural processing machinery, linear configuration of processing machinery, and the need for access by a large loading vehicle such as a forklift to such machinery, present difficult challenges in the development of a mobile workstation which will allow for efficient and effective processing of plants in the field.

As shown in the Figures, in accordance with the teachings of this disclosure, a mobile, self-powered, horticultural processing unit capable of facilitating the processing of a large number of plants, is disclosed. In particular a modular unit with a multi-level configuration and a compact footprint capable of performing a variety of different horticultural operations, is described herein.

Figure 1:
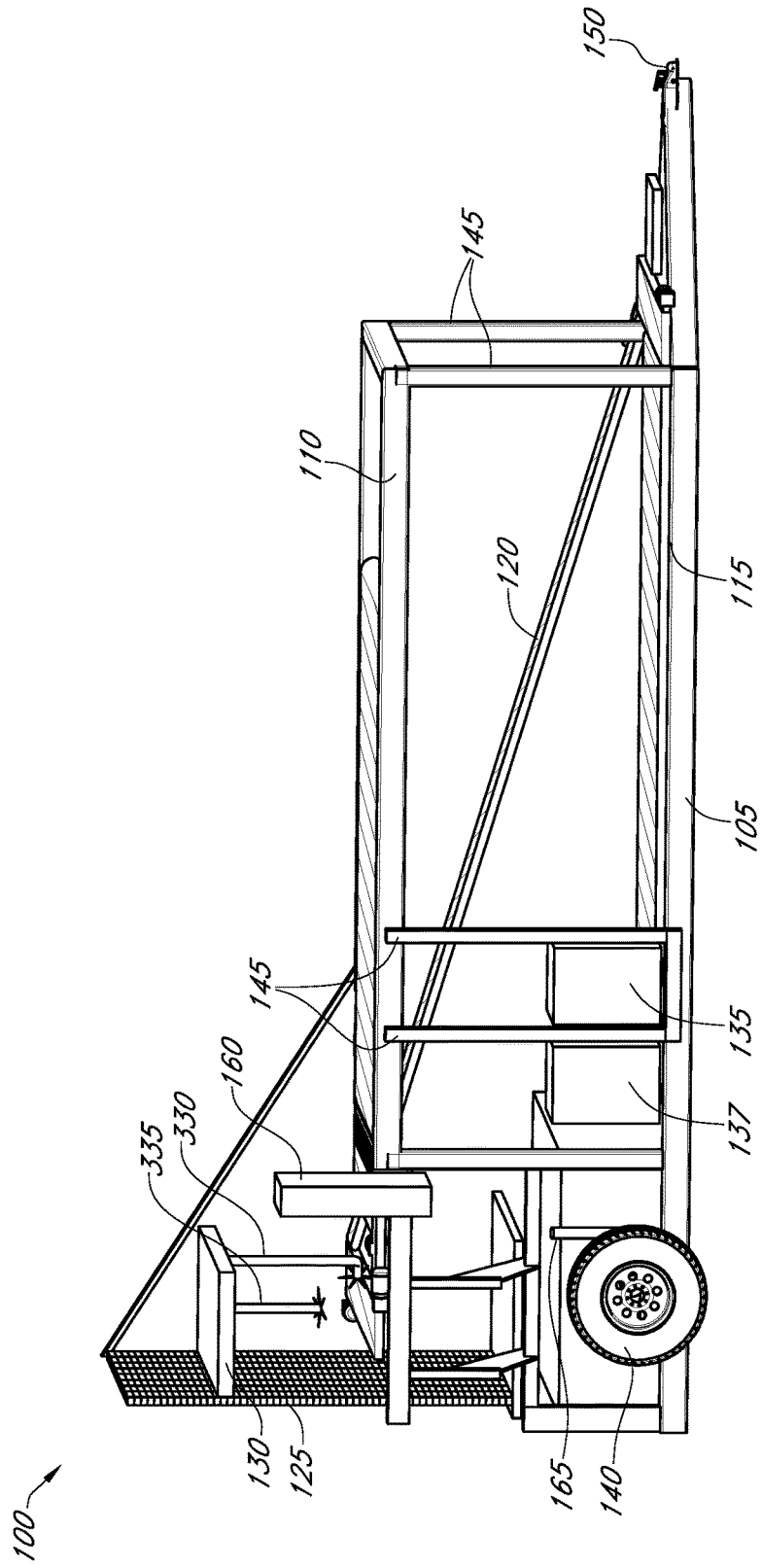
FIG. 1 shows a right side view of the mobile workstation of present embodiments.

FIG. 1 shows a right side view of the mobile horticultural workstation 100 of present embodiments. Shown in this view is the frame 105 upon which components are mounted. The frame may be made of steel, and may be composed of other study materials capable of supporting the weight of the unit while stationary, and shear stress applied to the unit when the workstation is towed. The frame may be composed of a plurality of steel beams and platforms which are welded together to form the frame. The frame may comprise one or more steel supports attached to the rear and sides of the frame which provide a location to mount machinery, hardware, motors, generators, and exhaust vents. Supporting beams and equipment attached to the frame may be attached by bolts. The bolts used to hold equipment and supporting beams to the frame may be tightened to approximately 80 ft-lbs.

The frame may define a box at one end which houses internal electrical and mechanical components. Alternatively, the box may be empty and serve as a collection bin for falling plant debris. The box structure may also support additional pieces of the frame equipment mounted above it. In an embodiment where the box structure serves as a collection bin, it may be attached to a hydraulic ram cylinder which is configured to dump the collection bin once it is full. The collection bin may pull outward from the frame before dumping backwards or to the side.

The frame may define an upper level 110 and a lower level 115. The upper level may be longer and have more available space across the length of the unit than the lower level. The upper level 110 and lower level 115 may be connected by plurality of vertical cross members 145 which support the upper level 110 and rigidly connect it with the lower level. The vertical cross members may be welded or bolted to the frame. If bolted, the bolts may be tightened to approximately 80 ft-lbs. The vertical cross members 145 may also be composed of steel or another sturdy material capable of withstanding the shear stress imparted upon the cross members by weight of the frame and attached components when towing the unit. There may be vertical cross members at the right side corners of the unit, and along the center of the unit in between the upper and lower levels. In a particular embodiment, there may be two vertical cross members 145 at the right-side corners, four vertical cross members 145 in the center of the unit, two along each side, a platform supported by four shorter vertical cross members on the left side of the unit, with the platform supporting additional machinery and equipment mounts.

The frame may be configured to be mounted upon a wheel and suspension assembly such that it can more easily be moved, included by being towed. There may be two tires/wheel assemblies attached to a torsion axel, or other axel assembly, mounted on the rear side of the unit which permit the unit to be towed. The tires may be purchased from a variety of commercial suppliers for large capacity tires capable of supporting weight up to 7000 lbs., including, for example, the Contender TTT868 Size: ST235/80R16 tires, inflated to approximately 80 psi. There may be a towing assembly 150 on the opposite side of the unit comprising a towing hitch with two or more steel supports attaching it to the frame, and a stand 240 (FIG. 2) to support the unit once it is removed from the towing vehicle.

The wheel and suspension assembly 140 may be connected to a hydraulic lift 165 which lifts the frame upward from the wheel and suspension assembly 140 in order to provide clearance between the ground and the frame, allowing it to be towed. The system may utilize a valve and hydraulic ram cylinder on each side of the unit, attached at the wheel and suspension assembly, such as a dual acting 3×12×1.5-inch hydraulic cylinder rated for 3000 psi. In such an embodiment, the frame may be placed directly on the ground after the unit is towed to its desired location by engaging the hydraulic lifts and lowering the unit down to the ground.

The unit may use a torsion axel as the suspension system in the unit, which may be used to mount the trailer on the wheels. A torsion axel may mount directly to the trailer's frame and may be made of thick rubber cords concealed inside the axle's tubing. Torsion axels are created to resist torsion and create suspension, are dependable, produce a smoother ride, have no metal on metal contact, do not use a pass through axel, provide independent suspension for each wheel, improves trailer handling and control, and are generally maintenance free. A possible torsion axel used in the unit may be a Timbren 7000 lbs Axle-less Trailer Suspension torsion axel.

In some embodiments, there may be multiple tire and axel assemblies across the base of the unit such that it has wheels in the front, back, and possibly at certain points along the center of the unit. In such embodiments, the unit may be permanently lifted at the height of the axels and may not use hydraulic lifts in order to move the frame up and down onto the ground. In other embodiments, the unit may further comprise a more traditional suspension system as part of a tire and axel assembly, which may include struts or shocks, springs, linkages, bearings, joints, and other components.

Portions of the lower lever 115 may be used to house electrical and mechanical component of the unit. The unit may comprise a first and electrical connection box 135/137 on the lower level, possibly positioned adjacent to one another, and next to the collection box defined by the frame. The electrical connection boxes may control a generator and provide power to various other components on the unit, such as motors or horticultural processing machinery. The electrical connection boxes 135/137 and generator may comprise a series of standardized 120 V, 240 V, or 480 V electrical connections, as well as shut off switches and emergency shut off switches for the various components and outlets. In a particular a 240 V and 480 V may be convenient in order to readily connect the various industrial motors used in the unit. One or more generators may be used to power the unit, such as a Winco EC22000VE-17, 19 KW, 35 HP Briggs & Stratton, 3-phase, 240 V generator.

Figure 2:
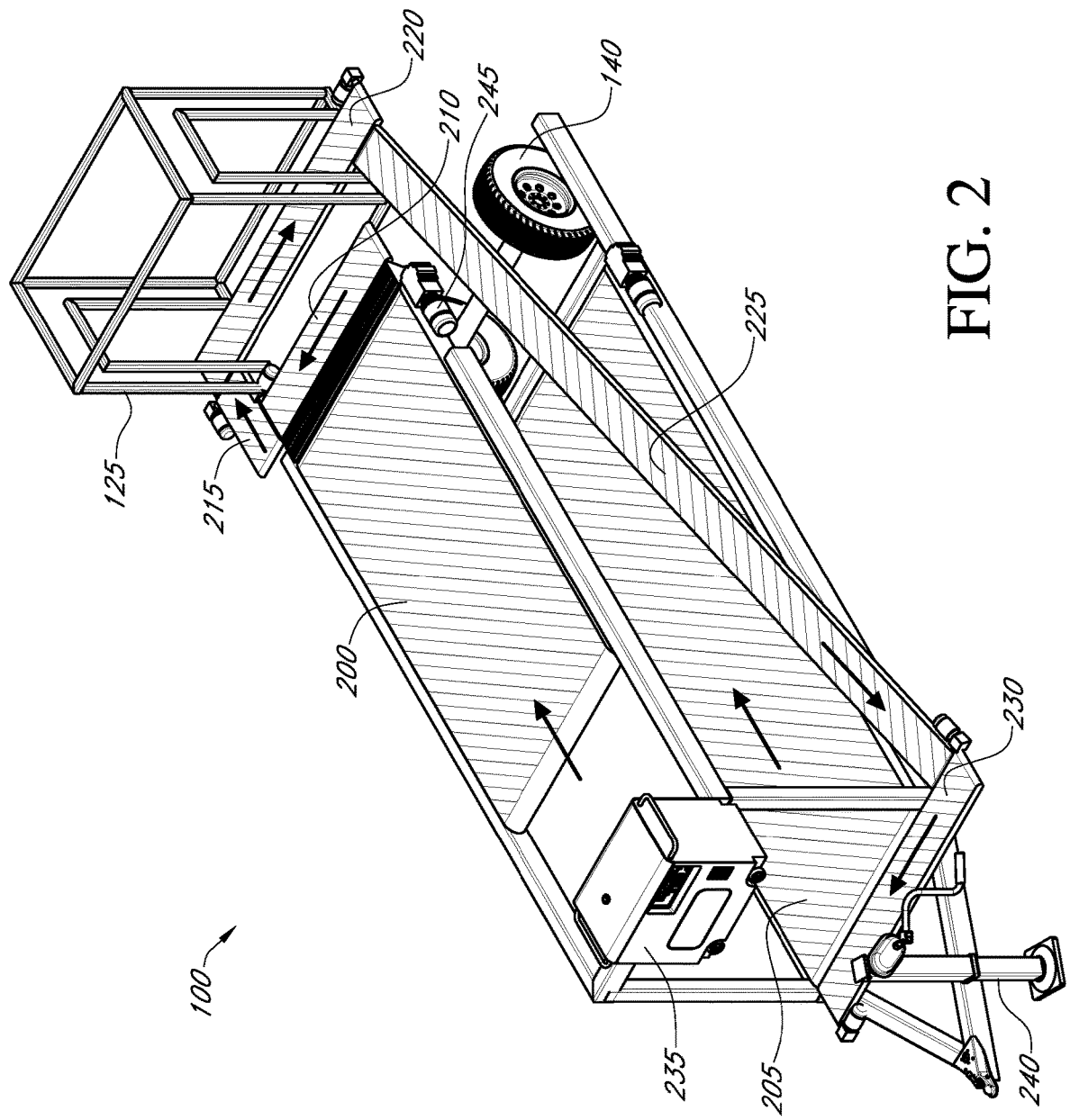
FIG. 2 shows a front-left perspective view of the mobile workstation of present embodiments.

FIG. 2 shows a front-left perspective view of the mobile workstation of present embodiments. Shown in this view are a series of conveying platforms beginning on the upper level, and which lead to the lower level. Each platform may comprise a conveyer belt which is attached to a motor and configured to move in at least one direction. The conveying platforms may be reversible, with the motors configured to move the conveyer belts in the reverse direction. The conveyer belts may be composed from rubber, polyester, polyvinyl chloride, silicone, polyethylene, other polymers, or any other suitable material which provides adequate traction for the items placed upon it. In this view, there is an alternative structure used for the equipment mounts 125, which may comprise a plurality of supports which define a box like space surrounding one or more of the conveying platforms.

The plurality of conveying platforms may begin with a first upper conveying platform 200 positioned on the upper level which generally moves in a direction along the length of the frame. The first upper conveying platform 200 may by long enough to accommodate a standard sized forklift inputting or removing a plurality of plants on the platform, and may provide enough room on both ends for the forklift operate and maneuver towards and away from the platform. The first upper conveying platform 200 may move in at least one direction, and may move towards the rear of the unit, and towards another conveying platform positioned adjacent to the upper conveying platform 200. The conveyor belt of the first upper conveying platform 200 may be powered by a motor 245 which rotates the conveyer belt attached to the conveying platform surface. A large conveyor belt such as the one located on the first upper conveying platform 200 may be powered by larger motor than used by other conveyor belts, such as a Transtecno ITB423 90 B14 motor.

Positioned below the first upper conveying platform 200 there may be a second lower conveying platform 205 which is generally parallel to the first upper conveying platform 200. Like the upper platform, it may provide enough room on both ends for the forklift operate and maneuver towards and away from the platform, and in particular may be adapted for a forklift to leave or remove a plurality of plants on the platform. The second lower conveying platform 205 may move in at least one direction, may move towards the rear end of the unit, and receive input from another conveying platform positioned adjacent to the lower conveying platform 205. A large conveyor belt such as the one located on the second lower conveying platform 205 may be powered by larger motor than used by other conveyor belts, such as a Transtecno ITB423 90 B14 motor.

There may be a series of intermediate conveying platforms connecting the upper and lower conveying platforms 200/205. As the plants move along the series of conveying platforms, they may come into contact with one or more horticultural machines which perform a variety of different operations on the plants such as: rinsing, pruning, canning, staking, weeding, applying fertilizers or pesticides, etc.

There may also be equipment mounts 125 attached to the rear portion of the frame and positioned adjacent to one or more of the intermediate conveying platforms to mount the horticultural machinery on, such that the machinery is positioned above the plants as they move along the series of intermediate conveying platforms. The equipment mounts may be a steel grate attached to the frame. The smaller intermediate conveying platforms may be powered by smaller sized motors than is used to power the larger conveyer belts, such as a Transtecno TS 633-4 motor.

There may be a third conveying platform 210 positioned adjacent to the first upper conveying platform 200. The third conveying platform 210 may have a length which is approximately equal to the width of the first upper conveying platform 200, and may run in a direction orthogonal to the direction of the conveyer belt on the first upper conveying platform. The third conveying platform 210 may move discontinuously and rest as the first upper conveying platform 200 moves plants onto it. The third conveying platform 210 may move a single row of plants received from the first upper conveying platform 200 along the series of conveying platforms onto the next platform in the series. The third conveying platform may be powered by its own motor positioned underneath or adjacent to the platform.

There may be a fourth conveying platform 215 positioned adjacent to the to the third conveying platform 210 that moves in a direction substantially orthogonal to the third conveying platform. The fourth conveying platform 215 may connect the third platform 210 to a fifth platform 220. The fourth conveying platform may be powered by its own motor positioned underneath or adjacent to the platform.

Figure 5:
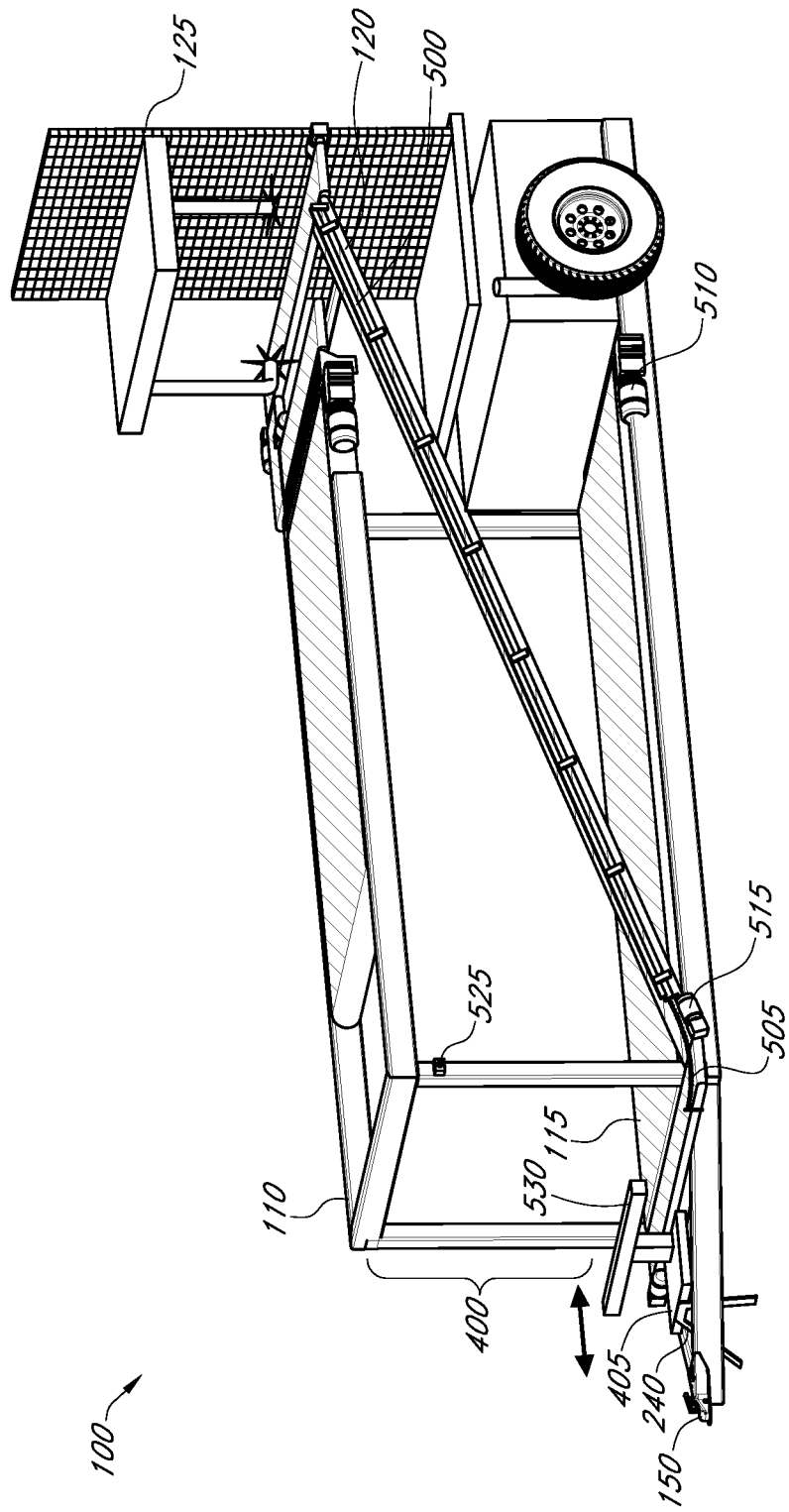
FIG. 5 shows a front-right perspective view of the mobile workstation of present embodiments.

There may be a fifth conveying platform 220 positioned adjacent to the fourth conveying platform 215 which moves in at least one direction substantially orthogonal to the fourth conveying platform. The fifth conveying platform 220 may be positioned adjacent to the equipment mounts 125 attached to the rear portion of the frame such that horticultural machinery can be mounted above the fifth conveying platform 220. As plants move across the fifth conveying platform 220, they may contact the horticultural machinery on the equipment mounts 125 before moving to the sixth conveying platform 225, which connects the upper level to the lower level. Once on the lower level, the plants may move from the sixth conveying platform 225 onto a seventh conveying platform 230, before being pushed onto the second lower conveying platform 205 platform by a pushover unit 530 (FIG. 5).

The pushover unit may be a generally horizontal structure which moves back and forth, is positioned adjacent to the seventh conveying platform 230, and is approximately the width of the second lower conveying platform 205. The seventh conveying platform may 230 may move in a discontinuous motion (i.e. stop and go) in order to facilitate a particular spacing between plants in the x direction. Similarly, the second lower conveying platform 205 may also move in a discontinuous motion (i.e. stop and go) in order to facilitate a particular spacing between plants in the y direction, such that a forklift can pick up a plurality of plants from the second lower conveying platform 205 and place them back in the field with the desired spacing in both the x and y directions.

Alternatively, the seventh conveying platform may be a two directional conveyer which is capable of moving left to right (x direction) in addition to forward and backwards (y direction), in order to move the plants received from the sixth conveying platform 225, onto the second lower conveying platform 205.

In another alternative embodiment, there may be two conveying platforms in place of the seventh conveying platform, where one moves plants received from the sixth conveying platform 225 left to right onto the next platform, by one plant pushing the plant in front of it down the platform; while the next platform moves forwards and backwards to move a row of plants onto the second lower conveying platform 205. However, this may prevent the unit from achieving a proper spacing of plants on the lower conveying platform.

Figure 3:
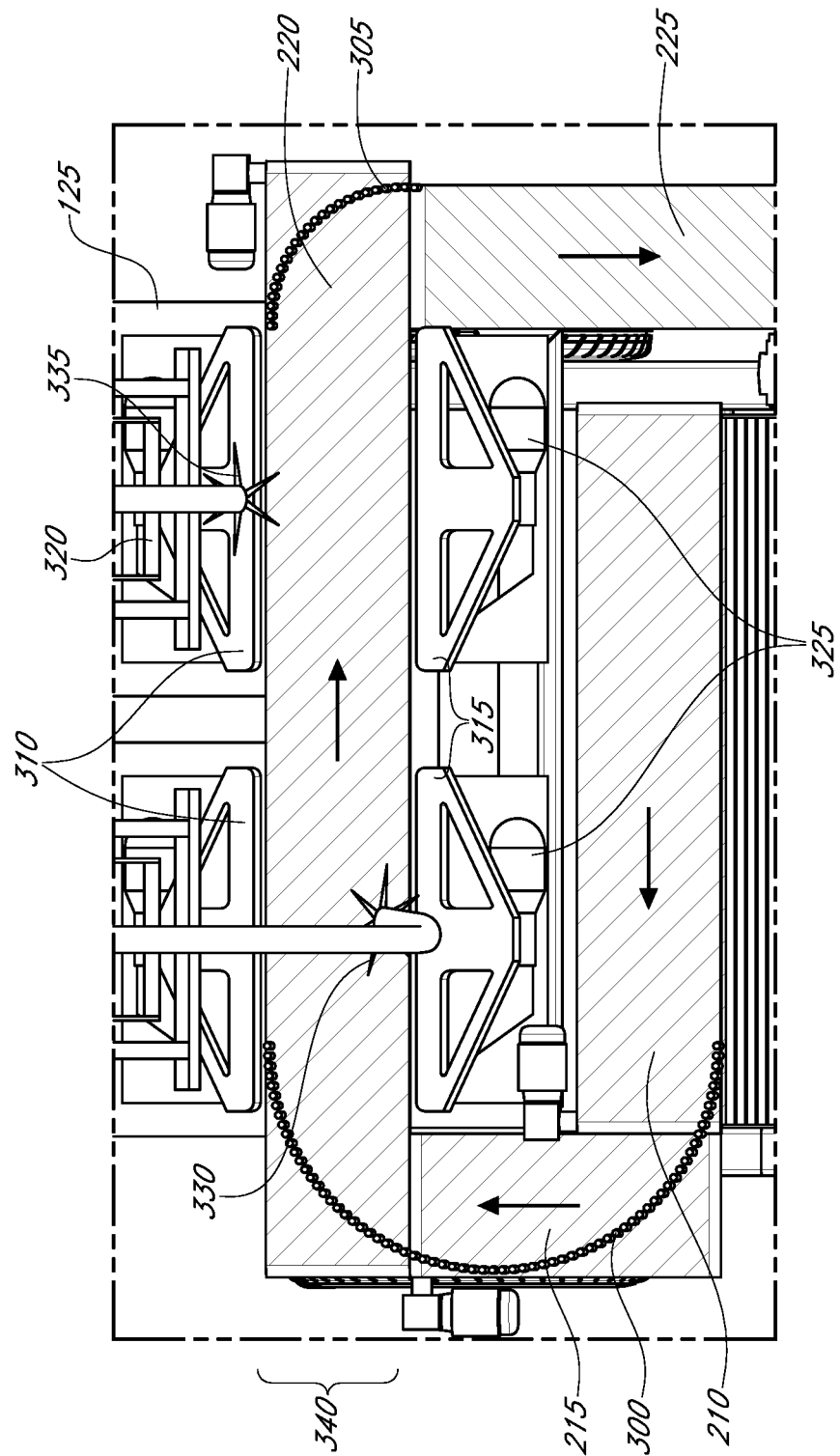
FIG. 3 shows a top down view of a section of conveying platforms of the mobile workstation of present embodiments.

FIG. 3 shows a top down view of a section of conveying platforms in a mobile workstation of present embodiments, and specifically shows the third, fourth, fifth, and sixth conveying platforms 210/215/220/225. Each of the third, fourth, fifth, and sixth conveying platforms may be positioned adjacent to platform preceding it, and each may move in a direction orthogonal to the preceding platform. The third conveying platform 210 and the fifth 220 conveying platform may move in opposite directions; and the fourth conveying platform 215 and the sixth conveying platform 225 may move in opposite directions.

Connecting the third conveying platform 210 to the fifth conveying platform 220, there may be a first series of rollers 300 positioned in a half arc which smoothly guides plants passing along the third conveying platform to the fourth conveying platform 215, and then from the fourth conveying platform onto the fifth conveying platform. Similarly, connecting the fifth conveying platform 220 to the sixth conveying platform 225, there may be a second series of rollers 305 positioned in a quarter arc which smoothly guides plants passing from the fifth conveying platform onto the sixth conveying platform 225. There may also be a third series of rollers 510 (FIG. 5) positioned in a quarter arc connecting the sixth conveying platform 225 to the seventh conveying platform 230 which function in a similar manner.

The series of rollers or guidewheels may be built from an arch frame, possibly in the shape of a quarter or half arc. The arch frame may have a plurality of holes are drilled into it. The plurality of holes may then be tapped to add threads to them, and cam followers screwed into the holes in the arch frame. Cam followers are stud type track rollers which are generally ready to mount into a threaded hole, with a cylindrical exterior surface rotating about a bearing. The surface of the cam followers may be polished, and may become smoother as they are worn in during use. The first series of rollers 300 positioned in a half arc may comprise between 30 and 50 cam followers, and may comprise approximately 40 cam followers in a present embodiment.

The second and third series of rollers 305/510 positioned in a quarter arc may comprise between 10 and 30 cam followers, and may comprise approximately 20 cam followers in a present embodiment. The length of the series of rollers built from an arch frame and cam followers may be adjusted to suit the needs of a particular embodiment, and may be longer or shorter in length, or utilize more or less cam followers than what is specified herein. The series of rollers 300/305/510 may be bolted to the members extending from the sides of the conveying platforms or the frame, or otherwise be fastened to the unit at a suitable location using fastening means known within the art.

Alternatively, the series of rollers may be described as a plurality of metal tubes or guidewheels which each rotate about an axis, the tubes being positioned adjacent to one another. The tubes may be polished to have a smooth surface and a low coefficient of friction. As a potted plant moves along the platforms, it may contact the rollers with the sides of its container, which may prevent the plants from falling over the edge or otherwise or falling off the track established by the conveying platforms. In particular, if the containers in which the plants are potted are circular, the plants may move smoothly along the first series of rollers and from the third conveying platform 210, over the fourth conveying platform 215, and onto the fifth conveying platform 220. Similarly, potted plants may smoothly move from the fifth conveying platform 220 onto the declining sixth conveying platform 225; and from the declining sixth conveying platform 225 onto the seventh conveying platform 230.

Having a series of rollers or guidewheels positioned in an arc along the conveying platforms beginning at the third conveying platform, extending across the fourth conveying platform 215, and onto the fifth conveying platform 220, and in other locations on the unit wherein they connect various conveying platforms, may allow for greater variability in the speed and synchronization of the series of conveying platforms, accommodating a faster and less synchronized motion among the platforms than would otherwise be possible in the absence of the plurality of rollers. For instance, potted plants that would otherwise fall off or tip over as they are transitioned onto the next platform in the series when the conveyer belts are moving quickly will instead contact the plurality of rollers, smoothly rolling the plant along the platform. The rollers or guidewheels being polished smooth as to have minimal friction with the containers may help ensure the plants do not get caught on the rollers as they contact them.

Positioned along each length of the fifth conveying platform 220 there may be at least one rotary belt, a series of rotary belts, or a plurality of rotary belts 310/315. The first series of rotary belts 310 may comprise a frame, attachment points for mounting the rotary belt unit, electrical connections, a vertically positioned rotary belt, and a motor 320 configured to move the rotary belt in at least one direction. The vertically positioned rotary belts may be 0.25-2 inches wide, may be 0.5 inches wide in a particular embodiment, and may comprise a plurality of raised ridges on the surface of the belts resembling a serrated knife edge to better allow them to grip the containers of plants which they contact. The rotary belts may be composed from rubber, polyester, polyvinyl chloride, silicone, polyethylene, other polymers, or any other suitable material which provides adequate traction for the items placed upon it. The first series of rotary belts 310 may be configured to move the same direction. The rotary belts may also be described as very narrow conveyer belts.

Positioned on the opposite length of the fifth conveying platform 220 there may be a second series of rotary belts 315. The second series of rotary belts may similarly comprise a frame, attachment points for mounting the rotary belt unit, electrical connections, a vertically positioned rotary belt, and a motor 325 configured to move the vertically positioned rotary belt in at least one direction. The vertically positioned rotary belts may be as narrow as 0.25-3 inches wide, may be 0.5 inches wide in a particular embodiment, and may comprise a plurality of raised ridges on the surface of the belts resembling a serrated knife edge to better allow them to grip the containers of plants which they contact. The second series of rotary belts 315 may be configured to move the same direction, but in an opposite direction relative to the first series of rotary belts 310. A smaller motor than ones used to power the intermediate conveying platforms may be used to power the rotary belts, such as a RP Techniek T1A-IE1 63 3-4 motor.

The first and second series of rotary belts 310/315 may be spaced apart from each other at a distance 340 between them that is approximately the diameter of a container of the potted plants which will be run through the system. This will allow for both a rotary belt 310 on the first length of the fifth conveying platform 220 and a rotary belt 315 on the second length of the fifth conveying platform 220 to contact the container. With both sides of the container in contact with rotary belts moving in opposite directions, this will cause the plant moving along the fifth conveying platform 220 to rotate.

The speed of the rotary belts 310/315 may be adjustable as to cause the plants to rotate faster or slower, or to achieve a specific number of rotations as they move along the fifth conveying platform 220. The rotation of the plants as they move along the platform may allow for improved contact with horticultural processing machinery positioned above the platform, and allow for an improved result to be achieved in a single pass relative to the result which would be achieved in the absence of rotation.

The distance 340 between first and second series of rotary belts 310/315 may be adjustable as to accommodate plants of various size. The first and second series of rotary belts 310/315 may be moved closer to or further away from the center of the conveying platform which they border by rotating adjustment wheels 725 (FIG. 7) positioned on the rear of the unit which move the rotary belts 310/315 back and forth.

A variety of horticultural processing machinery may be mounted upon the equipment mounts 125 attached to the rear portion of the frame. The equipment mounts may be a metal grate and may provide a large number of points at regularly spaced intervals upon which to mount machinery. The machinery may serve various functions including pruning, staking, canning, watering, rinsing, and application of fertilizers and pesticides.

In horticulture, pruning is the process of selectively trimming immature plants in order to produce enhanced growth of the plant. For instance, trimming the tip of a plant at the center of a branch at a node may lead to two branches growing up from underneath the node where the initial branch was trimmed. Pruning machinery placed upon the horticultural processing unit of present embodiments may comprise one or more rotating clipper blades which trim the extremities of plants as they rotate and plants pass through them.

There may be a first rotating asterisk (*) or star shaped clipper blade positioned vertically and adjacent to a first rotary belt along the length of the fifth conveying platform 220. The clipper blades used in the unit may be Lommers Star Blades. The vertically positioned clipper blade may be positioned in between the first and second series of rotary belts 310/315, and within the width of the fifth conveying platform. The first vertically positioned clipper blade may cut the extremities of plants which extend a certain distance horizontally beyond the length of the pot. There may be multiple vertically positioned clipper blades positioned along a length of the platform. As the plants are rotated by the first and second series of rotary belts 310/315, they may make at least one complete rotation as they move through the first vertically positioned clipper blade. This may result in the complete and automated pruning of the horizontally extending extremities of the plant as it moves along the fifth conveying platform 220.

There may be a second rotating asterisk (*) or star shaped clipper blade positioned horizontally and adjacent to a second rotary belt along the length of the fifth conveying platform 220. The horizontally positioned asterisk shaped clipper blade may be positioned above the first and second series of rotary belts 310/315, but in between the first and second series of rotary belts 310/315, and above the fifth conveying platform. The second horizontally positioned asterisk shaped clipper blade may cut the extremities of plants which extend a certain distance vertically beyond the length of the pot. There may be multiple horizontally positioned asterisk shaped clipper blades positioned along a length of the platform. As the plants are rotated by the first and second series of rotary belts 310/315, they may make at least one complete rotation as they move through the second horizontally positioned clipper blade. This may result in the complete and automated pruning of the vertically extending extremities of the plant as it moves along the fifth conveying platform 220.

The rotation speeds and positioning of each of the horizontal and vertical asterisk shaped clipper blades may be adjustable. Variable speed motors may be used to power the clipper blades, such as the FinParts T90LBX4 motor. The rotation speeds of the clipper blades may be adjusted to best meet the needs of particular plants, rotating faster and imparting more force as may be needed to prune larger, thicker plants; and rotating slower and imparting less force as is necessary to prune smaller plants without damaging them beyond pruning them. In certain embodiments, the horizontal and vertical asterisk shaped clipper blades may not even need a sharp edge to cut through the plants, with the force of rotation of a narrow and dull piece of metal being sufficient to prune the plants.

The position of the vertically positioned asterisk shaped clipper blade may be adjusted to accommodate different species of plants at different stages of their development, possibly being positioned nearer the center of the conveying platform for smaller and less mature plants, while being positioned further away from the center for larger plants which for which longer extremities are desired. Similarly, the position of the horizontally positioned asterisk shaped clipper blade may be adjusted to accommodate different species of plants at different stages of their development, possibly being positioned nearer the surface of the conveying platform for smaller and less mature plants, while being positioned further away from the surface of the conveying platform for larger plants which for which longer extremities are desired. The position of the clipper blades may be adjusted using adjustment wheels positioned on the rear of the unit which move them up and down, or backwards or forward depending on the orientation of the clipper blade. In combination, the horizontal and vertical asterisk shaped clipper blades may serve to prune all sides of a plant to particular dimensions, especially when the plant passing through them is rotated by the first and second series of rotary belts 310/315. Each rotating clipper blade may comprise its own motor.

Figure 4:
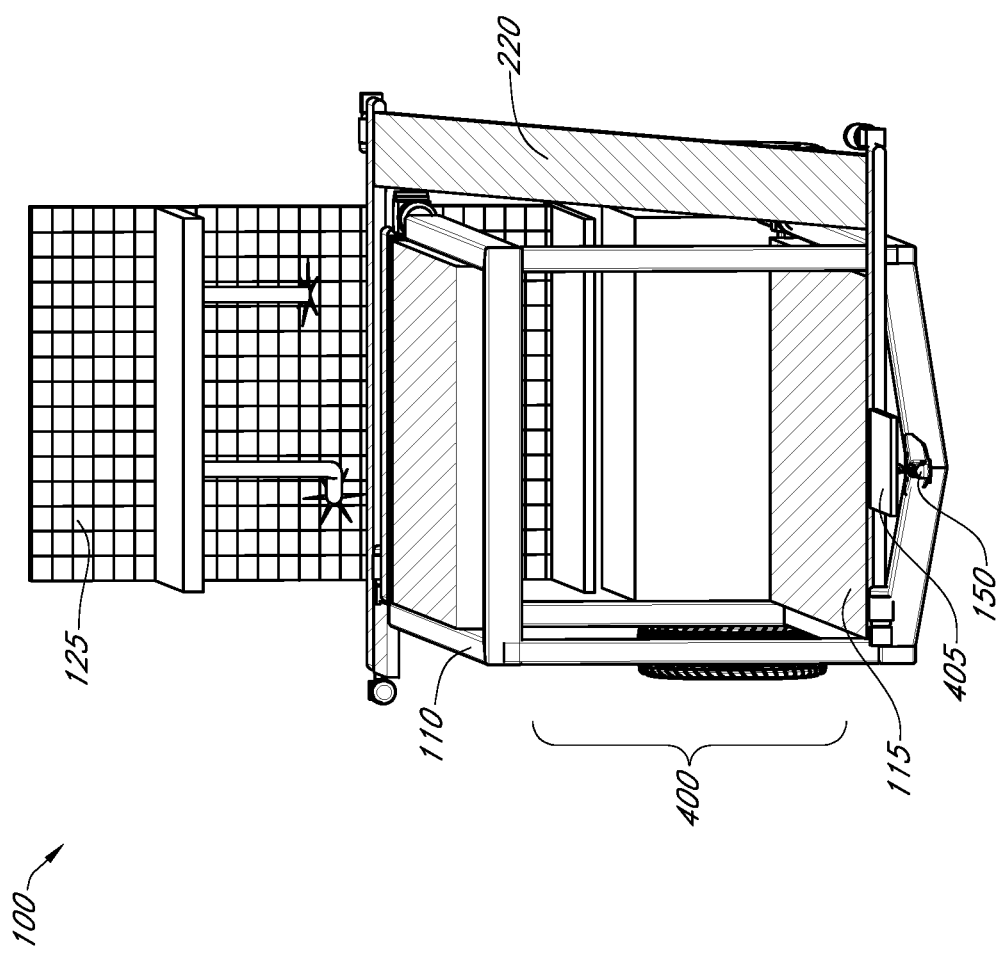
FIG. 4 shows a front view of the mobile workstation of present embodiments.

FIG. 4 shows a front view of the mobile workstation of present embodiments. Shown in this view is the upper level 110, lower level 115, the equipment mounts 125 attached to the rear portion of the frame, which may be a metal grate, the sixth conveying platform 120 which connects the upper and lower levels, the towing assembly 150 which permits the unit 100 to be towed, and the forward stationary platform 405 which provides a surface upon which additional equipment may be mounted. The space 400 between the upper and lower levels may be large enough to allow for a forklift to maneuver up and down while holding a plurality of plants which are to be removed from the second lower conveying platform 205. The sixth conveying platform 225 may be a ramp which connects the upper level at the fifth conveying platform 220 to the lower level at the seventh conveying platform 230.

FIG. 5 shows a front-right perspective view of the mobile workstation of present embodiments. Shown in this view is the upper level 110, the first upper conveying platform, the conveyer motor 245, the equipment mounts 125 the plurality of asterisk shaped clipper blades, the space 400 in between the upper and lower levels, the forward stationary platform 405, the stand 240, and towing assembly 150. Also shown is the guard rail 500 which runs the length of the sixth conveying platform 225 that connects the upper and lower levels, a conveyor motor 505, another conveyer motor 510, and an emergency shut off switch 525. The guard rail 500 which runs along the length of the sixth conveying platform may be useful as to prevent plants from falling of the platform and onto the ground. There may be guard rails on each side of the sixth conveying platform.

The seventh conveying platform 230 may be positioned adjacent to the sixth conveying platform 225, and move in a direction orthogonal to the sixth conveying platform. There also may be a pushover member 530 attached to a motor configured to move back and forth positioned along the length of the seventh conveying platform 230. The pushover member 530 may be mounted upon the forward stationary platform 405, and be configured to push a row of plants from the seventh conveying platform 230 onto the second lower conveying platform 205. The seventh conveying platform 230 may be configured to line up plants from the sixth conveying platform 225 into a row. This pushover member 530 may benefit the unit by moving the row of plants from the seventh conveying platform to the second lower conveying platform without requiring additional conveyors, as the seventh conveying platform 230 may move in a direction orthogonal to the second lower conveying platform 205 and the sixth conveying platform 225.

Figure 6:
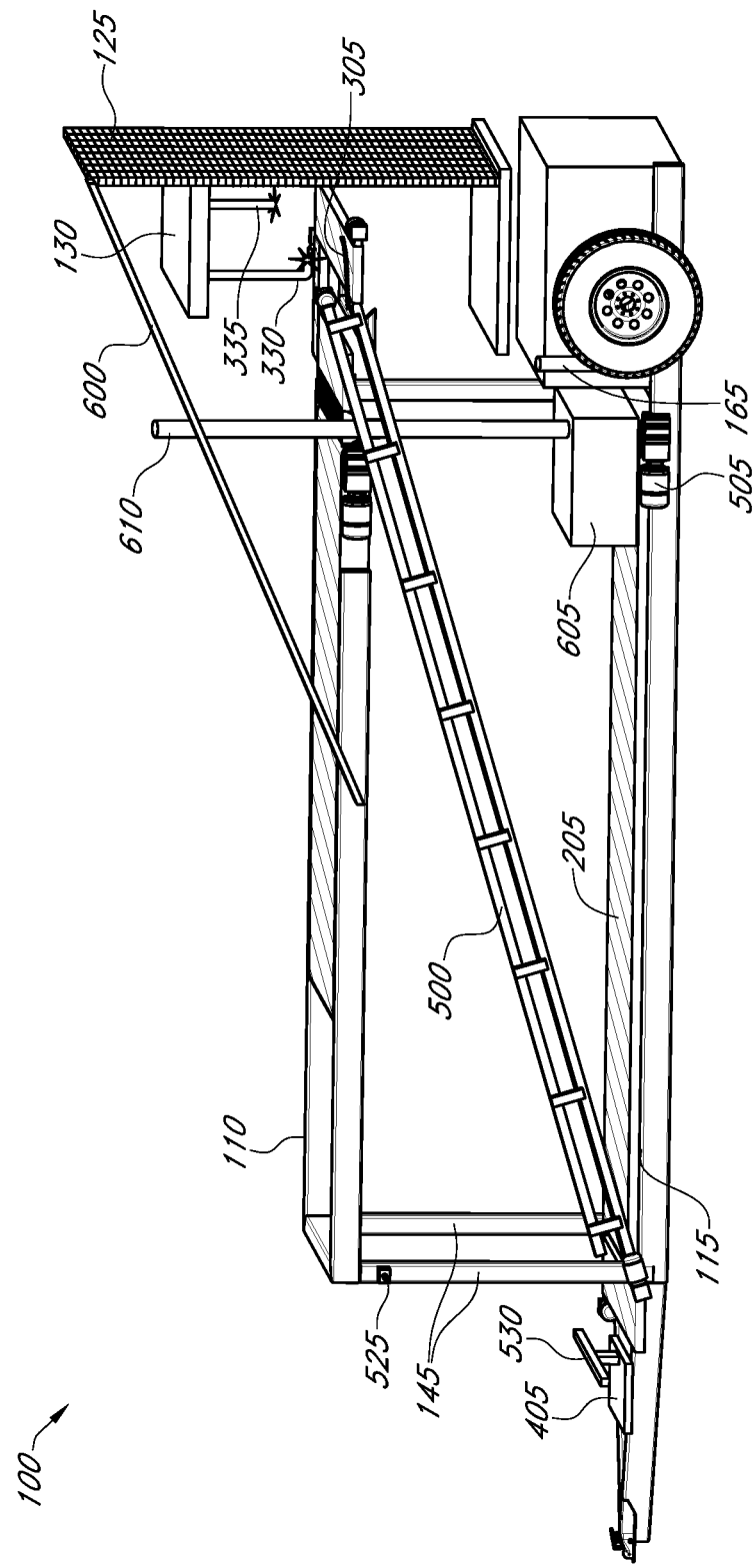
FIG. 6 shows a left side view of the mobile workstation of present embodiments.

FIG. 6 shows a left side view of the mobile workstation of present embodiments. Shown in this view is the upper level 110, lower level 115, cross members 145, equipment mounts 125, horticultural machinery 130, the pruning blades 330/335, rollers 305, guard rail 500 positioned along the sixth conveying platform, emergency shut off switch 525, conveyer motor 505, forward stationary platform 405, and lower conveying platform 205. Also shown is the pushover member 530, a diagonal cross member 600 connecting the equipment mounts to the frame 105 at the upper level 110, an onboard generator 605, and an exhaust shaft 610. The generator may be gas powered, and the exhaust shaft 610 may be positioned to vent the exhaust from the generator at a height away above the top of the unit 100, and at a safe distance away from any workers in the area of the unit.

In certain embodiments, there may also be one or more work stations built along the length of the sixth conveying platform 225. The work stations may be configured to allow for a worker to sit or stand adjacent to a platform and perform operations on the plants as they move along the platform. For example, one or more work stations positioned adjacent to the length of the sixth conveying platform 225 may be a low-cost way to allow for a worker to weed or stake a large number of plants in a relatively short time period as compared to walking through a field and weeding or staking plants manually. There may also be one or more storage compartments positioned within reach of the work stations along the length of the platform as to provide a place for worker to dispose of weeds or pull stakes to insert into the plants. Alternatively, the area above the fifth conveying platform where horticultural machinery is mounted may be reconfigured to comprise one or more workstations, and workers may be able to access plants as they move along the platforms at this location.

Figure 7:
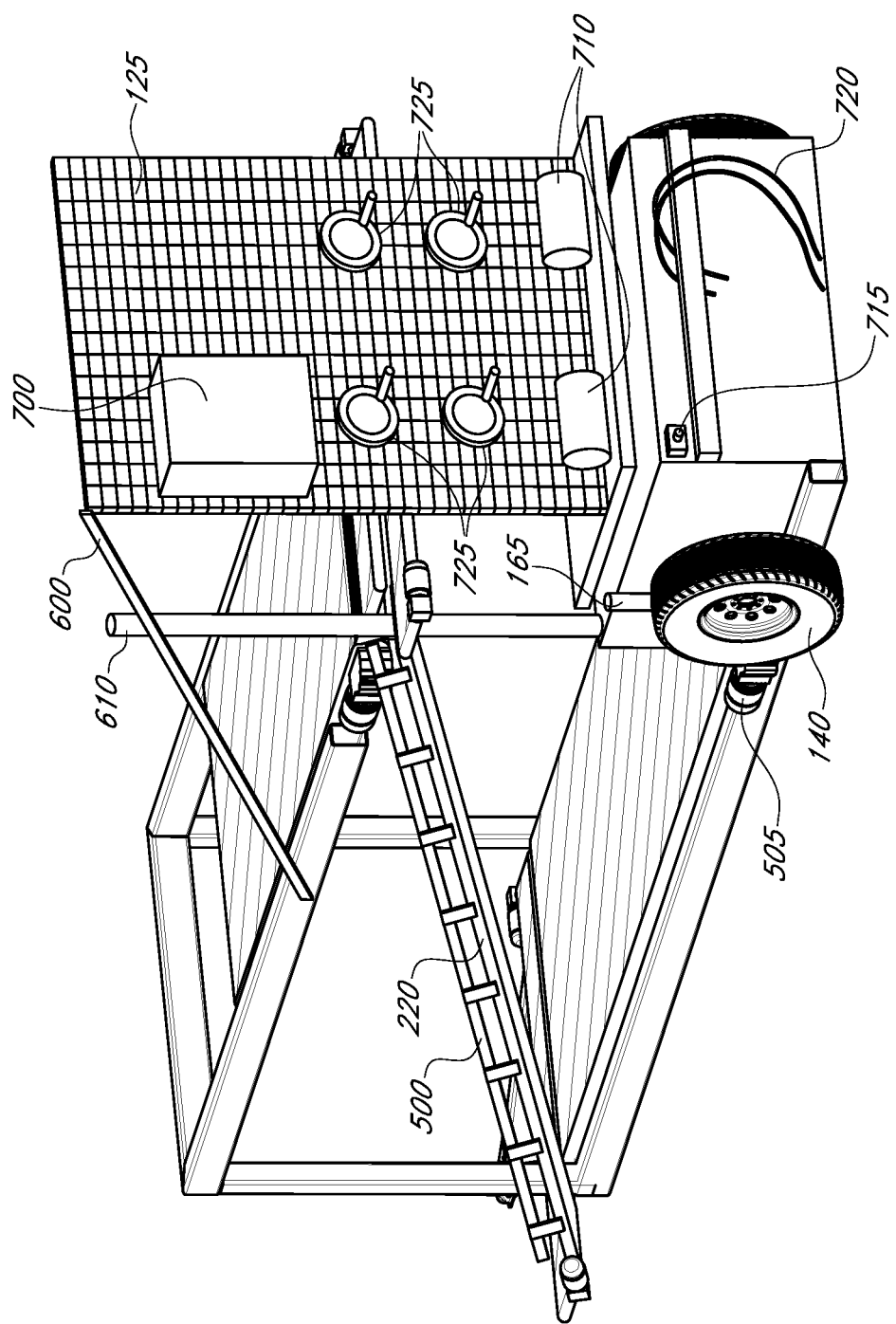
FIG. 7 shows an alternative rear perspective view of the mobile workstation of present embodiments.

FIG. 7 shows an alternative rear perspective view of the mobile workstation of present embodiments. Shown in this view are the equipment mounts 125, the sixth conveying platform 220 connecting the upper and lower levels, the guard rail 500 positioned along the sixth conveying platform, the diagonal cross member 600, the generator exhaust 610, a conveyor motor 505, the wheel and suspension assembly 140, and hydraulic lift 165. Also shown is a third electrical connection box 700, additional equipment motors 710, an emergency shut off switch 715, adjustment wheels 725, and hydraulic lines 720 running into the interior of the unit, which connect to the hydraulic ram which dumps the collection bin. The hydraulic lines 720, electrical box 700, and other components of the unit may be water tight or encased in a water-resistant material in order to permit the unit to be left outside uncovered and to operate in the rain. All of the motors used in the unit may be watertight such that rain cannot permeate the motor casing, permitting them to operate in the rain. In addition, there may be covers or awnings which can be attached to the equipment mounts and the frame of the unit in order to further protect it from the rain.

In addition to pruning, other horticultural processing machinery may be mounted upon the unit. Considering the application or removal of fertilizer and pesticides as an example, there may be a tank fitted to the frame of the unit which contains water, fertilizer, or pesticide; a pump powered by the generator onboard the unit; a mister or sprayer; and at least one hose connecting a tank to the pump and mister. As the plants move along the series of conveying platforms, fertilizer may be applied by a sprayer or mister, and possibly later diluted with the spraying of water. Similarly, pesticide may be applied as the plants move along the platforms, with it possibly being later removed or diluted with the application of water.

Likewise, plants may be watered as they move through the unit by a similar equipment configuration, with the unit possibly being connected to an external water supply. The weight of the plant and their containers may be increased by watering the plants, and it may be desirable to weigh down smaller and lighter plants such that they are more quickly and efficiently be processed through the unit without tipping over, or being pushed over by the force of the pruning shears or movement of the platforms.

Staking could be accomplished in a similar manner, wherein a machine configured to insert stakes into pots is attached to the equipment mounts and inserts stakes into the plants as they pass underneath it. Alternatively, it may be accomplished by workers at workstations, the workstations possibly being positioned on the side of the connecting ramp platform which moves the plants from the upper level to the lower level. Weeding may be accomplished in a similar fashion where a worker positioned at a workstation removes weeds from the plants as they pass in front of them.

The mobile horticultural processing unit of present embodiments can also be configured to space plants apart at a specified distance, which is yet another horticultural processing step that has previously been labor intensive and time consuming. When plants are grown from seeds, they are often spaced apart "can tight," with each pot touching the pot next to it. This helps to promote the growth of the plants as they tend to grow upward as they complete with adjacent plants for sunlight. It also reduces the water needs of the plant due to adjacent plants providing shade to the pots of adjacent plants, and efficiently catching water which is irrigated to the plants by dripping down from above. Once plants reach a certain stage of development however, they must be pruned (trimmed) and spaced apart such that they will grow outward in the horizontal direction and not just upward. Presently, spacing of plants in the field is something which is accomplished manually by individual workers.

Spacing of plants at a specified distance can be accomplished by the mobile horticultural processing unit of present embodiments. First, the conveying platforms may move at a set speed such that there is not a build up of plants running through the unit. Next, at least one platform may move in a discontinuous motion. Having a platform move discontinuously in a stop and go manner at a set interval will create the desired spacing between plants by moving one plant down the line while stopping to wait for the next one, thus creating the spacing regardless of the manner in which they were introduced into the unit.

Using present embodiments as an illustrative example, and referring to FIGS. 2, & 5-6, this may be accomplished by plants moving down the declining sixth conveying platform 225, and onto the seventh conveying platform 230, the seventh conveying platform moving in a stop and go motion. Following receipt of a plant, the seventh conveying platform 230 will move the plant down the platform to the desired spacing distance between pots in the x direction, will stop and wait for the next plant, and then repeat.

Once a full row of plants spaced at the desired distance along the seventh conveying platform 230 is collected, the pushover member 530 may then push the plants onto the second lower conveying platform 205. Then, in a similar fashion, the second lower conveying platform 205 may move in a stop and go motion once a row of plants is received, move the row of plants down the platform the desired spacing distance along the y direction, stop and wait for the next row of plants, and then repeat. In this manner, a uniform spacing of plants can be achieved by the horticultural processing unit of present embodiments in both the x and y directions. A forklift with several tines spaced at distance corresponding to the desired spacing may then remove the plants from the platform, and place them back in the field with the spacing still intact.

The mobile horticultural processing unit of present embodiments can also be configured to space plants apart in an alternating pattern, to create a checkerboard like pattern of plants. This can be accomplished by alternatingly spacing every other row of plants received on the seventh conveying platform at the same distance apart, but offset from the prior row, and possibly with one less plant. For instance, there may be 3 plants spaced apart at a set distance in a first row (and all odd number rows), and 2 plants spaced apart at the same distance in the gap between the plants in the prior row in a second row (and all even number rows). Alternatively, there may be 5 plants in first row, and 4 plants in a second row, or any other number of plants that fits on the conveyer belt.

The horticultural processing unit may further comprise a computer or a central control unit located in the electrical connection box 137/135 (FIG. 1) which controls the operation of the unit, including the conveyer belts, such that it can be programed to achieve a particular spacing between plants. The unit may further comprise a means for detecting the location of plants along a conveying platform such as an IR or optical sensor, which may provide information to the computer or controller. A particular spacing between plants may be achieved by setting a particular timing between movement of the conveying platforms used in the spacing process considering the size of the plants, the desired spacing, and the movement of the conveyer belt. Alternatively the desired operation can be achieved by manual operation, or possibly in response to input from a sensor which detects the position of the plants along the platform, which triggers a response by the control unit to move the conveyer belt.

The mobile horticultural processing unit of present embodiments can also be configured to accommodate canning of plants, also called transplanting. In such an embodiment, there may be a transplanting machine positioned along one of the conveying platforms, work stations for one or more workers positioned along a subsequent conveying platform, along with a soil reservoir within reach of the workers. As the plants move along the conveying platform and through the transplanting machine, it may use a rotating hook shaped tool to sever the roots at a particular of a plant at a set distance, such that workers positioned along a subsequent platform could remove the plant, repot it, cover it with new soil, and place it back on the platform.

Alternatively, a transplanting machine loaded with uprooted plants or seedlings grown in rockwool or another rooting medium may be used. In this embodiment, pots partially filled with soil may move along the conveying platforms, the seedling or uprooted plant may be placed into the pot by the machine, and additional soil may be placed into the pot to cover the plant by a worker located at a workstation along a subsequent conveying platform. It is also possible that empty pots may move along the platform and be filled with soil by a machine configured to drop a set amount of soil into the pots before receiving a seedling or uprooted plant, further automating the process. Similarly, newly transplanted plants could also automatically be covered with soil.

In alternative embodiments, the mobile horticultural processing unit may have different configurations other than the seven conveying platform embodiments described above. For example, it may be possible for the mobile horticultural processing unit to utilize an elevator positioned adjacent to the upper conveying platform wherein horticultural processing machinery is positioned above and on the sides of the elevator platform. The desired horticultural operation may be performed along the elevator platform, as it moves from the upper level to the lower lever on the elevator. Then there may be a pushover member which moves the plurality of plants onto the second lower conveying platform. This process may then repeat until a sufficient number of rows have accumulated for them to be removed by a forklift.

In another alternative embodiment, there may be fewer conveying platforms in the system. For example, instead of the four-platform loop on the upper level, there may only be one conveying platform which moves a plurality of plants from the first upper conveying platform to the connecting ramp platform. The series of rotary belts and horticultural processing machinery may be located along the length of the connecting ramp conveying platform, and accomplish the same level of processing as other configurations of the unit.

In yet another alternative embodiment, there may be conveying platforms in the system positioned on a single level, as opposed to an upper and lower level. In such an embodiment, there may be a longer sized trailer and frame used to mount equipment on in order to provide sufficient space for all of the various components of the unit.

One of ordinary skill in the art will recognize the inventive principles disclosed are not limited to the embodiments disclosed herein, and that various aspects of the disclosed embodiments can be combined to achieve additional embodiments. The applications of the present invention have been described largely by reference to specific examples and in terms of particular allocations of functionality to certain components. However, those of skill in the art will recognize that the invention can also be produced by components that distribute the functions of embodiments of this invention differently than herein described. Such variations and implementations are understood to be captured according to the following claims and within this disclosure.

What is claimed is:

1. An apparatus comprising:
a frame upon which components are mounted;
a first upper conveying platform positioned on an upper level which moves in at least one direction;
a second lower conveying platform positioned on a lower level which moves in at least one direction and which is positioned below the first upper conveying platform;
a third conveying platform positioned adjacent to the first upper conveying platform which moves in at least one direction substantially orthogonal to the first conveying platform;
a fourth conveying platform positioned adjacent to the third conveying platform which moves in at least one direction substantially orthogonal to the third conveying platform;
a fifth conveying platform positioned adjacent to the fourth conveying platform which moves in at least one direction substantially orthogonal to the fourth conveying platform;
a sixth conveying platform positioned adjacent to the fifth conveying platform which moves in at least one direction and connects at least one platform on the upper level to at least one platform on the lower level;
a seventh conveying platform positioned adjacent to the sixth conveying platform which moves in at least one direction substantially parallel to the third conveying platform,
wherein the seventh conveying platform is adjacent to the second conveying platform,
wherein the first and second conveying platforms are adapted to allow for access by a forklift from at least one direction;
a first series of rotary belts located along the length of a first side of a conveying platform, orientated substantially orthogonal to the conveying platform, which move in at least one direction; and
a second series of rotary belts located along the length of a second side of a conveying platform, orientated substantially orthogonal to the conveying platform, which move in at least one direction, and
wherein the first and second series of rotary belts rotate an object which passes between them on the conveying platform.

2. The apparatus of claim 1 further comprising:
a first series of rollers positioned generally in an arc which begin at the third conveying platform and end at the fifth conveying platform;
a second series of rollers positioned generally in an arc which begin at the fifth conveying platform and end at the sixth conveying platform; and
a third series of rollers positioned generally in an arc which begin at the sixth conveying platform and end at the seventh conveying platform.

3. The apparatus of claim 1 further comprising a pushover member positioned adjacent to the seventh conveying platform.

4. The apparatus of claim 3 wherein the pushover member moves discontinuously in a repeating motion in at least one direction substantially orthogonal to the length of the seventh conveying platform.

5. The apparatus of claim 1 further comprising equipment mounts located along the length of at least one conveying platform.

6. The apparatus of claim 5 further comprising a vertically orientated pruning blade positioned along a conveying platform, and a horizontally orientated pruning blade positioned along a conveying platform.

7. The apparatus of claim 6 wherein the pruning blades are located along the fifth conveying platform, and have adjustable speed.

8. The apparatus of claim 1 further comprising a collection bin positioned underneath a conveying platform.

9. The apparatus of claim 1 wherein exterior components of the apparatus are water resistant.

10. The apparatus of claim 1 wherein the speed of the conveying platforms is adjustable.

11. The apparatus of claim 1 further comprising an onboard generator which is configured to power the apparatus.

12. The apparatus of claim 1 further comprising:
a wheel and suspension assembly upon which the frame is mounted;
a hydraulic lift attached to the wheel and suspension assembly configured to lift the apparatus off the ground and onto the wheel and suspension assembly; and
a towing assembly attached to the frame which allows for the apparatus to be towed by a motor vehicle.

13. The apparatus of claim 1 further comprising at least one work station configured for use by a person mounted along the length of at least one of the conveying platforms, which provides access to objects moving along at least one conveying platform.

14. A portable horticultural processing system comprising:
a frame upon which components are mounted;
a wheel and suspension assembly upon which the frame is mounted;
a towing hardware assembly attached to the frame which allows for the system to be towed by a motor vehicle;
a series of conveying platforms configured to move at least one plant along a path from an upper level to a lower level;
at least one structure configured to mount horticultural processing machinery along the path established by the series of conveying platforms,
wherein the series of conveying platform is configured to allow for access by a forklift at an upper platform, in at least one direction, and a lower platform, in at least one direction;
a first series of rotary belts located along a length of a first side of a conveying platform, orientated substantially orthogonal to the conveying platform, which move in at least one direction; and
a second series of rotary belts located along a length of a second side of a conveying platform, orientated substantially orthogonal to the conveying platform, which move in at least one direction, and
wherein the first and second series of rotary belts rotate an object which passes between them on the conveying platform.

15. The horticultural processing system of claim 14 further comprising an onboard generator to provide power for the system.

16. The horticultural processing system of claim 14 further comprising a plurality of guidewheels connecting at least two conveying platforms.

17. The horticultural processing system of claim 14 further comprising at least one platform configured for use by a worker which provides access to plants as they move along the series of conveying platforms.

18. A portable, self-powered, horticultural processing unit comprising:
a frame upon which components are mounted;
a wheel and suspension assembly upon which the frame is mounted;
a hydraulic lift attached to the wheel and suspension assembly configured to lift the unit off the ground and onto the wheel and suspension assembly;
towing hardware attached to the frame;
a plurality of conveying platforms;
a generator configured to power the unit and provide standardized electrical connections;
wherein at least one conveying platform is configured to allow for input of a plurality of plants,
wherein at least one conveying platform is configured to allow for removal of a plurality of plants;
a plurality of rotary belts which rotate plants along a portion of the length of at least one of the conveying platforms;
a plurality of guidewheels connecting at least two conveying platforms; and
a collection bin positioned underneath a conveying platform.

* * * * *